(12) United States Patent
Charles et al.

(10) Patent No.: US 11,983,432 B2
(45) Date of Patent: May 14, 2024

(54) LOAD SHARING OF COPY WORKLOADS IN DEVICE CLUSTERS

(71) Applicant: Dell Products L.P., Round Rock, TX (US)

(72) Inventors: Peniel Charles, Bangalore (IN); Kurumurthy Gokam, Bangalore (IN); Venkatesh Doddamane Nagaraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 17/731,517

(22) Filed: Apr. 28, 2022

(65) Prior Publication Data

US 2023/0350599 A1    Nov. 2, 2023

(51) Int. Cl.
*G06F 3/06* (2006.01)

(52) U.S. Cl.
CPC .......... *G06F 3/0653* (2013.01); *G06F 3/0604* (2013.01); *G06F 3/0679* (2013.01)

(58) Field of Classification Search
CPC .... G06F 3/0653; G06F 3/0604; G06F 3/0679; G06F 3/065; G06F 3/067
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Sean D Rossiter
(74) *Attorney, Agent, or Firm* — Ryan, Mason & Lewis, LLP

(57) ABSTRACT

An apparatus comprises a processing device configured to identify a plurality of data portions from a source storage volume to be copied to a target storage volume, and to analyze performance of respective ones of a plurality of host devices in connection with at least one copying operation. Respective ones of the plurality of host devices are assigned to perform copying of respective subsets of the plurality of data portions to the target storage volume based, at least in part, on the analysis.

20 Claims, 5 Drawing Sheets

(56) References Cited

U.S. PATENT DOCUMENTS

| | | | |
|---|---|---|---|
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,156 B2* | 12/2019 | Noh | G06F 3/064 |
| 10,521,369 B1 | 12/2019 | Mallick et al. | |
| 10,536,514 B2* | 1/2020 | Huang | H04L 67/568 |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,911,402 B2 | 2/2021 | Pusalkar et al. | |
| 10,915,407 B2* | 2/2021 | Mark | G06F 11/3034 |
| 11,392,315 B1* | 7/2022 | Cady | G06F 3/0605 |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salli | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0039109 A1* | 2/2017 | Damgar | G06F 11/1451 |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0019054 A1 | 1/2021 | Anchi et al. | |
| 2021/0026551 A1 | 1/2021 | Tidke et al. | |
| 2021/0026650 A1 | 1/2021 | Rao et al. | |
| 2021/0157502 A1 | 5/2021 | Rao et al. | |
| 2021/0181965 A1 | 6/2021 | Anchi et al. | |
| 2021/0279070 A1* | 9/2021 | Shaw | G06F 16/1824 |
| 2021/0286548 A1* | 9/2021 | Ma | G06F 3/064 |
| 2022/0269610 A1* | 8/2022 | Lee | G06F 3/0679 |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: ISCSI Implementation for Dell EMC Storage Arrays Running PowerMaxOS," Technical White Paper, Sep. 2019, 35 pages.

NVM Express, "NVM Express Base Specification, Revision 2.0a," NVM Express, Jul. 23, 2021, 454 pages.

Wikipedia, "Starvation (computer science)" https://en.wikipedia.org/w/index.php?title=Starvation_(computer_science)&oldid=1050480787, Oct. 18, 2021, 2 pages.

* cited by examiner

500

| CYCLE | NODE ID | NUMBER OF CHUNKS REQUESTED | NUMBER OF CHUNKS COMPLETED | TIME TAKEN FOR COMPLETION IN SECONDS | CURRENT COPY SWEEP CAPACITY IN CHUNKS/SEC |
|---|---|---|---|---|---|
| 1 | 1 | 100 | 100 | 2 | 50 |
| 1 | 2 | 100 | 80 | 10 | 8 |
| 1 | 3 | 100 | 100 | 7 | 14 |
| 2 | 1 | 400 | 400 | 10 | 40 |
| 2 | 2 | 64 | 64 | 10 | 6 |
| 2 | 3 | 112 | 112 | 6 | 18 |
| 3 | 1 | 320 | 320 | 6 | 53 |
| 3 | 2 | 48 | 48 | 3 | 16 |
| 3 | 3 | 144 | 144 | 8 | 18 |

FIG. 5

LOAD SHARING OF COPY WORKLOADS IN DEVICE CLUSTERS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. Different ones of the host devices can run different applications with varying workloads and associated TO patterns. Such host devices also generate additional IO operations in performing various data services such as replication and migration, which may utilize a significant amount of host device resources.

SUMMARY

Illustrative embodiments disclosed herein provide techniques for distribution of migration workloads among a plurality of host devices.

For example, some embodiments advantageously configure a migration node to periodically distribute copy workloads to a plurality of host devices. In illustrative embodiments, the performance of the respective host devices for one or more copy cycles is used to dynamically step up or step down a copy workload distributed to the respective host devices in one or more subsequent copy cycles.

In one embodiment, an apparatus comprises at least one processing device that includes a processor and a memory, with the processor being coupled to the memory. The at least one processing device is configured to identify a plurality of data portions from a source storage volume to be copied to a target storage volume, and to analyze performance of respective ones of a plurality of host devices in connection with at least one copying operation. Respective ones of the plurality of host devices are assigned to perform copying of respective subsets of the plurality of data portions to the target storage volume based, at least in part, on the analysis.

The at least one processing device illustratively comprises at least a portion of a host device.

These and other illustrative embodiments include, without limitation, apparatus, systems, methods and computer program products comprising processor-readable storage media.

BRIEF DESCRIPTION OF THE DRAWINGS

FIG. 5 depicts a table of migration process details for a plurality of nodes in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
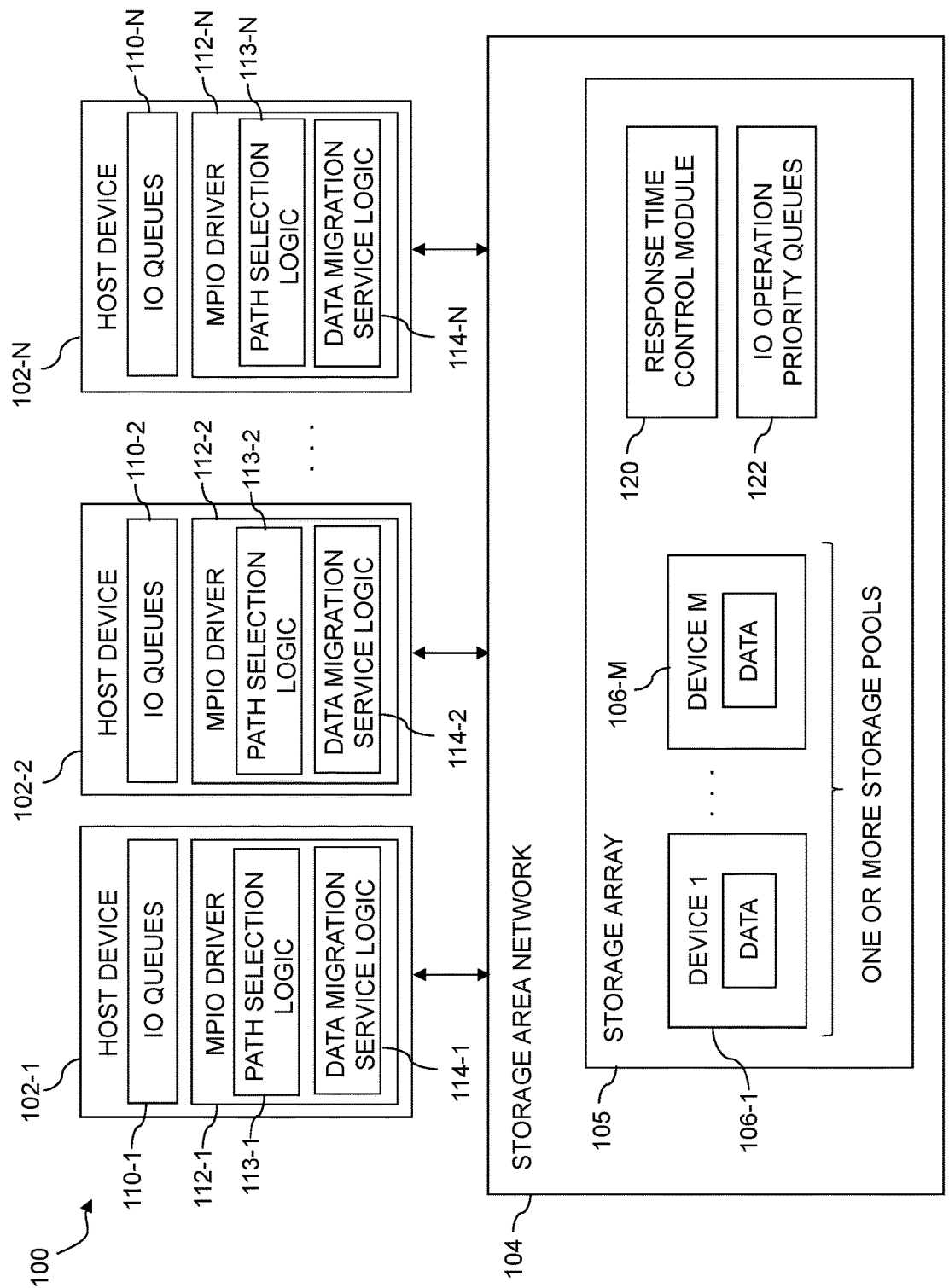
FIG. 1 is a block diagram of an information processing system configured with functionality for distribution of data migration workloads among a plurality of nodes in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, 106-2, ... 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

In some embodiments, the storage array 105 more particularly comprises a distributed storage array that includes multiple storage nodes interconnected with one another, possibly in a mesh network arrangement. Such an arrangement is an example of what is more generally referred to herein as a "distributed storage system."

As will be described in more detail below, illustrative embodiments provide techniques in which a migration node divides a storage volume into several blocks of equal size (referred to herein as "data chunks"). A migration service running on the migration node periodically (e.g., at designated time intervals) determines how many and which data chunks will be copied (e.g., bulk copied) by respective ones of the clustered nodes. The determination is based, at least in part, on the performance of respective ones of the clustered nodes in previous copying operations.

As used herein the terms "time intervals," "designated time intervals" or "specified time intervals" are to be broadly construed to refer to, for example, fixed (e.g., periodic) or variable time intervals (e.g., dynamically varying time periods).

As used herein, a "cluster" is to be broadly construed to refer to multiple devices, such as, for example, multiple servers, host devices or other physical devices (also referred to herein as "nodes"), that are grouped together to deliver services such as, for example, copying services. Nodes of a cluster can be redundant. As described in more detail herein, the migration node and other clustered nodes forming a cluster comprise a plurality of host devices 102.

In illustrative embodiments, clustering is used to provide certain desirable functionality and characteristics from the perspective of external users. Advantages include increased performance and availability over non-clustered systems. In an "active-active" (or "parallel") cluster, storage devices may be actively accessed from all nodes in the cluster, and the operating software (e.g., application software) of the nodes is responsible for synchronizing access to shared storage resources.

The host devices 102 illustratively comprise respective computers, servers or other types of processing devices capable of communicating with the storage array 105 over the SAN 104. For example, at least a subset of the host devices 102 may be implemented as respective processing devices of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, 110-2, . . . 110-N and respective multi-path input-output (MPIO) drivers 112-1, 112-2, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 113-1, 113-2, . . . 113-N implemented within the MPIO drivers 112. As explained in more detail herein, the multi-path layer, and more particularly, the respective instances of data migration service logic 114-1, 114-2, . . . 114-N, further includes functionality for control and implementation of migration operations between storage volumes. Logic components referred to herein can include various combinations of hardware, firmware and software. The term "logic" as used herein is therefore intended to be broadly construed.

The MPIO drivers 112 may comprise, for example, otherwise conventional MPIO drivers, such as PowerPath® drivers from Dell Technologies, suitably modified in the manner disclosed herein to provide functionality for control and implementation of migration operations between storage volumes. Other types of MPIO drivers from other driver vendors may be suitably modified to incorporate functionality for control and implementation of migration operations between storage volumes as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The MPIO drivers 112 of the host devices 102 or portions thereof, may be considered in some embodiments as forming part of what is referred to herein as a "multi-path layer." The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

It is also to be appreciated that a wide variety of other types of rate negotiation may be performed in other embodiments.

Various host-side scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a vendor unique (VU) command, or combinations of multiple instances of these or other commands, in an otherwise standardized storage access protocol command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path. Such host registration operations are illustratively part of a "host registration process" as that term is broadly used herein. As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others.

With conventional approaches, non-disruptive migrations which use host devices to implement storage volume copy operations (also referred to herein as "host copy operations") utilize a significant amount of host device resources during the copy operations. The copying operations may comprise, for example, bulk copy operations, where large amounts of data are migrated between storage volumes. For example, in some bulk copy operations, large amounts of data are imported from or exported to a relational database management system (RDBMS) database, such as, for example, a structured query language (SQL) server database. The copying operations referred to herein are not necessarily limited to bulk copy operations, and may comprise other types of copy operations.

With current approaches, when using host copy data transfer technology in a clustered environment comprising multiple host devices, only a single host device in the cluster performs the data migration. Since the data migration is only performed by one host device, the data migration may be slow and it may take a significant amount of time to complete migration of the data. For example, the time taken to complete migration of the data may be proportional to the size of the source LUN. Conventional approaches fail to factor in the presence of other nodes in a cluster which can be used in the migration, and do not consider the performance and workload of the other cluster nodes when assigning copy operations. Additionally, the number of concurrent copy operations may be undesirably limited to minimize the central processing unit (CPU) cycles consumed by the host devices performing the copy operations.

In an effort to address the above technical problems, illustrative embodiments advantageously provide techniques for using the performance of nodes for a given copy cycle to dynamically step up or step down copy workloads distributed to the nodes in a subsequent cycle. In more detail, illustrative embodiments provide, for example, a migration service running continuously on each node, a driver (e.g., kernel mode or user mode) on each node which processes the copy operation and a communication mechanism on each node to enable communication between nodes (e.g., via cluster input/output controls (IOCTLs) or any other similar methodology). The embodiments further provide techniques for maintaining a record of copy operation progress via, for example, a snapshot which can be analyzed by the migration node and viewed by all of the cluster nodes.

In some embodiments, migration involves synchronizing a target storage device or LUN to the source storage device or LUN, i.e., achieving an operating state in which the target storage device or LUN stores the same data as the source storage device or LUN, and then a path flip operation is performed so that subsequent accesses of the data are directed to the target storage device or LUN instead of the source storage device or LUN. Once the path flip operation is successfully accomplished, the source storage device or LUN can be taken out of service or put to some other use.

A number of data migration technologies are available to migrate data from a source LUN to a target LUN. One such data migration tool is PowerPath® Migration Enabler (PPME) from Dell Technologies, suitably modified in the manner disclosed herein to provide functionality for control and implementation of migration operations between storage volumes. PowerPath®, of which PPME is one component, is available on common operating systems such as Linux, Windows, AIX and VMware ESX. PPME uses multiple data transfer technologies for data migration including, for example, host copy, open replicator, and other similar technologies. Other types of data migration tools from other vendors may be suitably modified to incorporate functionality for control and implementation of migration operations between storage volumes as disclosed herein.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection.

Additional components not explicitly shown in the figure, such as one or more storage caches, may also be provided in the storage array 105 for use in processing IO operations. For example, in some embodiments, each of a plurality of storage controllers of the storage array 105 has a different local cache or a different allocated portion of a global cache associated therewith, although numerous alternative arrangements are possible. The storage controllers can be implemented as respective storage processors, directors or other storage system components configured to control storage system operations relating to processing of IO operations.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 2.0a, July 2021, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment comprises additional components, such as a response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 is assumed to operate in conjunction with the above-noted IO operation priority queues 122.

The storage array 105 illustratively utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

As another illustration, in some embodiments, the IO operation priority queues 122 are implemented as respective SLO-based queues. For example, the SLO-based queues illustratively may have respective different SLO levels, such as Diamond, Gold, Silver and Bronze, in this example arranged from a highest SLO to a lowest SLO, with higher SLOs having better response times than lower SLOs. The storage array 105 may be configured to provide different SLOs for different ones of the IO operations by assigning different ones of the IO operations to different ones of the SLO-based queues. The SLO-based queues are illustratively associated with respective SLOs for processing of IO operations in the storage array 105.

In these and other embodiments, process tags may be used in assigning different ones of the IO operations to different ones of the SLO-based queues or other IO operation priority queues 122 of the storage array 105, as disclosed in U.S. Pat. No. 10,474,367, entitled "Storage System with Input-Output Performance Control Utilizing Application Process Detection," which is incorporated by reference herein. However, use of process tags is not required, and other techniques can be used to assign particular IO operations received in the storage array 105 to particular ones of the IO operation priority queues 122.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a distributed storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active arrangements, ALUA/ANA arrangements and/or DALUA/DANA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 113 and data migration service logic 114, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated above, illustrative embodiments overcome various drawbacks of conventional practice by configuring the system 100 to include functionality for assigning copy operations to a plurality of nodes in a cluster based on the performance of nodes for past copy cycles, as will now be described in more detail.

Figure 2:
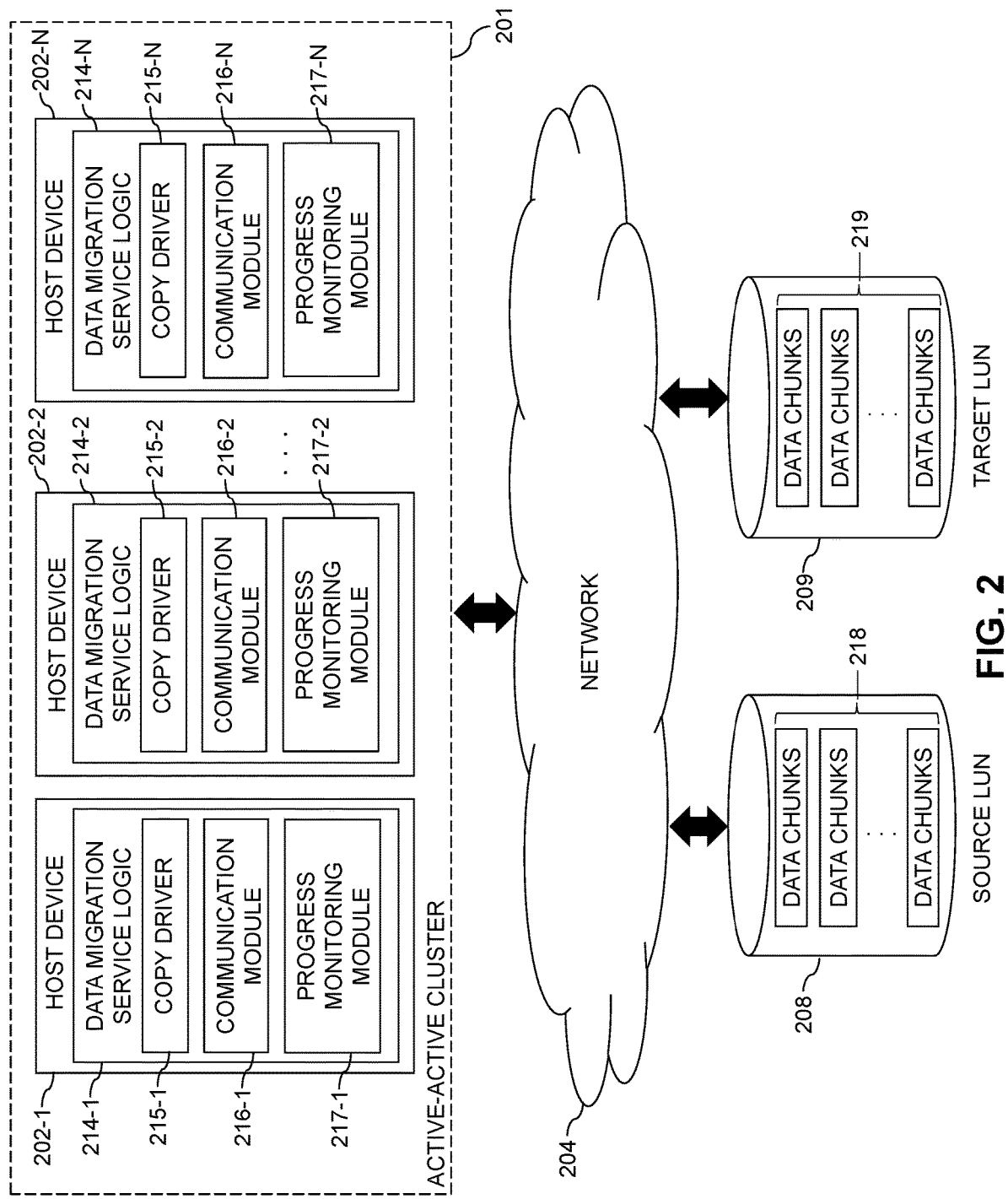
FIG. 2 is a block diagram illustrating an example data migration workload distribution arrangement in an illustrative embodiment.

With reference now to FIG. 2, in an active-active cluster 201 of host devices 202-1, 202-2, . . . 202-N, when a user initiates a migration of data from a source LUN 208 to a target LUN 209 using a particular host device 202, e.g., host device 202-1, that host device 202 may act as a migration node for the data migration. In illustrative embodiments, the cluster of host devices 202 may comprise some or all of host devices 102 (FIG. 1). For example, in some embodiments host devices 202 may comprise a subset of host devices 102 (FIG. 1) that are associated with the same LUN or LUNs where the indicator N in FIG. 1 may represent a different number of host devices than the indicator N in FIG. 2. While host device 202-1 acts as a migration node in an illustrative embodiment, any other host device 202 may act as the migration node. For example, if a user alternatively uses host device 202-2 to initiate the data migration, host device 202-2 may act as the migration node. Although FIG. 2 is discussed in terms of a source LUN 208 and a target LUN 209, the embodiments are not necessarily limited thereto, and may apply to other types of storage volumes.

Each of the host devices 202 comprises instances of data migration service logic 214-1, 214-2, . . . 214-N, which can be the same or similar to the instances of data migration service logic 114 in the host devices 102. The instances of data migration service logic 214 comprise copy drivers 215-1, 215-2, . . . 215-N, communication modules 216-1, 216-2, . . . 216-N and progress monitoring modules 217-1, 217-2, . . . 217-N. The migration node is configured to coordinate the actions of multiple host devices 202 of a cluster to implement the data migration in a distributed manner, e.g., by coordinating a host copy migration across the host devices 202 associated with the cluster. The migration node communicates with the other host devices associated with the cluster via the communication modules 216.

For example, using the communication module 216-1, the migration node, e.g., host device 202-1 in this example, distributes the "host copy migration job" across all host devices 202 associated with the cluster, e.g., host devices 202-1 . . . 202-N. In some embodiments, the migration node, e.g., 202-1, is configured to obtain a cluster host device count which identifies the number of host devices 202 associated with the cluster. In some embodiments, the cluster host device count may also comprise an indication of which host devices 202 are associated with the cluster. The migration node is also configured to obtain the capacity of the source LUN 208, e.g., the size of the source LUN 208 or size of the data on the source LUN 208 to be migrated.

As explained in more detail herein, in illustrative embodiments, using the data migration service logic 214, the migration node is configured to determine the portion of the data migration that each associated host device 202 will perform. The data migration may be performed by each associated host device 202 using a respective instances of the data migration service logic 214-1, 214-2, . . . 214-N, such as, for example, PPME as described above. In some embodiments, the instances of data migration service logic 214, and more particularly, the communication modules 216, communicate with the source LUN 208 and target LUN 209 via a network 204. Network 204 may, for example, include similar functionality to SAN 104, described above, and in some embodiments may comprise SAN 104.

In illustrative embodiments, the data migration service logic 214 of the migration node identifies a source storage volume to be copied (e.g., source LUN 208) and allocates the volume into several blocks of equal size (e.g., data chunks 218). For example, each data chunk may correspond to a designated number of megabytes or gigabytes. In connection with determining the number of data chunks 218 to be migrated by the respective host devices 202 of the active-active cluster 201, the data migration service logic 214 of the migration node analyzes performance of respective ones of the plurality of host devices 202 in connection with at least one copying operation. For example, the progress monitoring modules 217 of respective ones of the plurality of host devices 202 maintain records of performance of each one of the plurality of host devices 202 in connection with one or more copying operations (e.g., bulk copying operations). Based on the performance, the data migration service logic 214 of the migration node assigns respective ones of the plurality of host devices 202 to perform copying of particular numbers of data chunks 218 to the target LUN 209 to be written as copied data chunks 219, which respectively correspond to the data chunks 218.

For example, in analyzing performance of respective ones of the plurality of host devices 202, the data migration service logic 214 of the migration node identifies one or more host devices 202 with higher performance than one or more other host devices 202. For example, the data migration service logic 214 of the migration node ranks the host devices 202 based on their performance (e.g., in descending order of performance from a highest performing host device 202 to a lowest performing host device 202 or vice versa). In assigning the respective ones of the plurality of host devices 202 to perform the copying of the data chunks 218, the data migration service logic 214 of the migration node assigns higher performing ones of the host devices 202 to copy a higher number of data chunks 218 than lower performing ones of host devices 202.

For example, in illustrative embodiments, each of the progress monitoring modules 217 maintains a record of performance of a corresponding host device 202 over one or more copy cycles, wherein each copy cycle corresponds to a designated time interval (e.g., 10 seconds). The record comprises, for example, for each cycle, a number of data chunks requested to be copied by a given host device 202, a number of data chunks for which copying was completed by the given host device 202, and the time taken for completion of the copying. The record may further comprise a copy sweep capacity for each cycle for the given host device 202. In an illustrative embodiment, the copy sweep capacity for a given cycle is computed according to the following equation (1):

$$\text{Copy sweep capacity} = \frac{\text{Total number of data chunks completed in one cycle}}{\text{Time taken for completion of the copying of the data chunks}} \tag{1}$$

The migration node, via the communication modules 216, retrieves the records from the progress monitoring modules 217 and analyzes the performance data in the records to determine data chunk allocation to each host device 202 for subsequent copy cycles based on the analysis.

For example, the table 500 in FIG. 5 depicts sample data retrieved and/or analyzed by the migration node. The table 500 shows sample data for three cycles of 10 seconds each for a three-node cluster with node identifiers (IDs) 1, 2 and 3. In this case, the migration node may also be one of the nodes that is performing the copying (e.g., node 2). The node IDs may comprise unique identifiers such as, buy not necessarily limited to, world-wide names (WWNs), world-wide node names (WWNNs), World Wide Identifiers (WWIDs), location codes, serial numbers, logical partition (LPAR) and virtual machine (VM) identifiers and/or names and Internet Protocol (IP) addresses and/or names.

As can be seen in the table 500, the number of data chunks requested to be copied by nodes 1, 2 and 3 (e.g., three host devices 202) is 100 for each during a first cycle (cycle 1) and varies during subsequent cycles (cycles 2 and 3). As can be seen, in cycle 1, node 1 copies all of the requested data chunks in 2 seconds, such that its copy sweep capacity for cycle 1 is 50 chunks/second (100/2), node 2 copies 80 of the requested data chunks in 10 seconds, such that its copy sweep capacity for cycle 1 is 8 chunks/second (80/10), and node 3 copies all of the requested data chunks in 7 seconds, such that its copy sweep capacity for cycle 1 is about 14 chunks/second (100/7). Based on the copy sweep capacities for cycle 1, node 1 is the highest performing, node 3 is the second highest performing and node 2 is lowest performing. As a result, for cycle 2, based on the performance of nodes 1, 2 and 3 in cycle 1, the migration node assigns the most data chunks to be copied by node 1 (400), the second most to be copied by node 3 (112), and the least number of data chunks to be copied by node 2 (64). As can be seen, in cycle 2, node 1 copies all of the requested data chunks in 10 seconds, such that its copy sweep capacity for cycle 2 is 40 chunks/second (400/10), node 2 copies all of the requested data chunks in 10 seconds, such that its copy sweep capacity for cycle 2 is about 6 chunks/second (64/10), and node 3 copies all of the requested data chunks in 6 seconds, such that its copy sweep capacity for cycle 2 is about 18 chunks/second (112/6). Based on the copy sweep capacities for cycle 2, node 1 is the highest performing, node 3 is the second highest performing and node 2 is lowest performing. Similar to cycle 2, for cycle 3, based on the performance of nodes 1, 2 and 3 in cycle 2, the migration node assigns the most data chunks to be copied by node 1 (320), the second most to be copied by node 3 (144), and the least number of data chunks to be copied by node 2 (48). As can be seen, in cycle 3, node 1 copies all of the requested data chunks in 6 seconds, such that its copy sweep capacity for cycle 3 is about 53 chunks/second (320/6), node 2 copies all of the requested data chunks in 3 seconds, such that its copy sweep capacity for cycle 3 is 16 chunks/second (48/3), and node 3 copies all of the requested data chunks in 8 seconds, such that its copy sweep capacity for cycle 3 is 18 chunks/second (144/8). Based on the copy sweep capacities for cycle 3, node 1 is the highest performing, node 3 is the second highest performing and node 2 is lowest performing. However, in cycle 3, the performance of node 2 improved when compared to cycles 1 and 2, and is closer to that of node 3. As a result, in a subsequent cycle, the migration node will allocate an increased number of data chunks to node 2, which may be close the number of data chunks allocated to node 3.

In illustrative embodiments, the communication module 216 of the migration node reads the recorded data for each node for one or more cycles via an IOCTL or via a shared resource. The data migration service logic 214 of the migration node identifies the copy sweep capacities of each node for one or more cycles or, if not provided, computes the copy sweep capacities for each node for one or more cycles and assigns the next set of data chunks and the corresponding node IDs via an IOCTL or via a shared resource based on the copy sweep capacities for each node for the one or more cycles. The number of cycles used by the migration node to determine performance may vary. For example, the migration node may use one cycle to determine performance of each node and assign data chunks to be copied after each cycle, or use multiple (M) cycles to determine performance of each node and assign data chunks to be copied after M cycles, where M>1. In addition, the assignment to the higher performing nodes may be for one cycle or for a plurality of cycles. Advantageously, since the assignments are based on performance during copy operations, the migration node can estimate a current copy capacity of the nodes without needing resource data such as, for example, HBA speeds, array connectivity states, path latency, etc., and without needing data about a current workload that is present on a node (e.g., host device 202).

The performance data for previous cycles is recorded by a combination of the copy drivers 215 (e.g., kernel mode drivers that perform the copying) and a service running on each node (e.g., progress monitoring modules 217). According to illustrative embodiments, the migration node receives or requests updated performance data at designated time intervals or on demand. The migration node, via the communication modules 216, transmits the assignments to perform the copying of the respective numbers of data chunks for the one or more cycles to the respective ones of the plurality of host devices 202 in the active-active cluster 201.

Illustrative embodiments of the techniques and functionality of data migration service logic 114/214 will now be described in more detail with reference to the flow diagram of FIG. 3.

Figure 3:
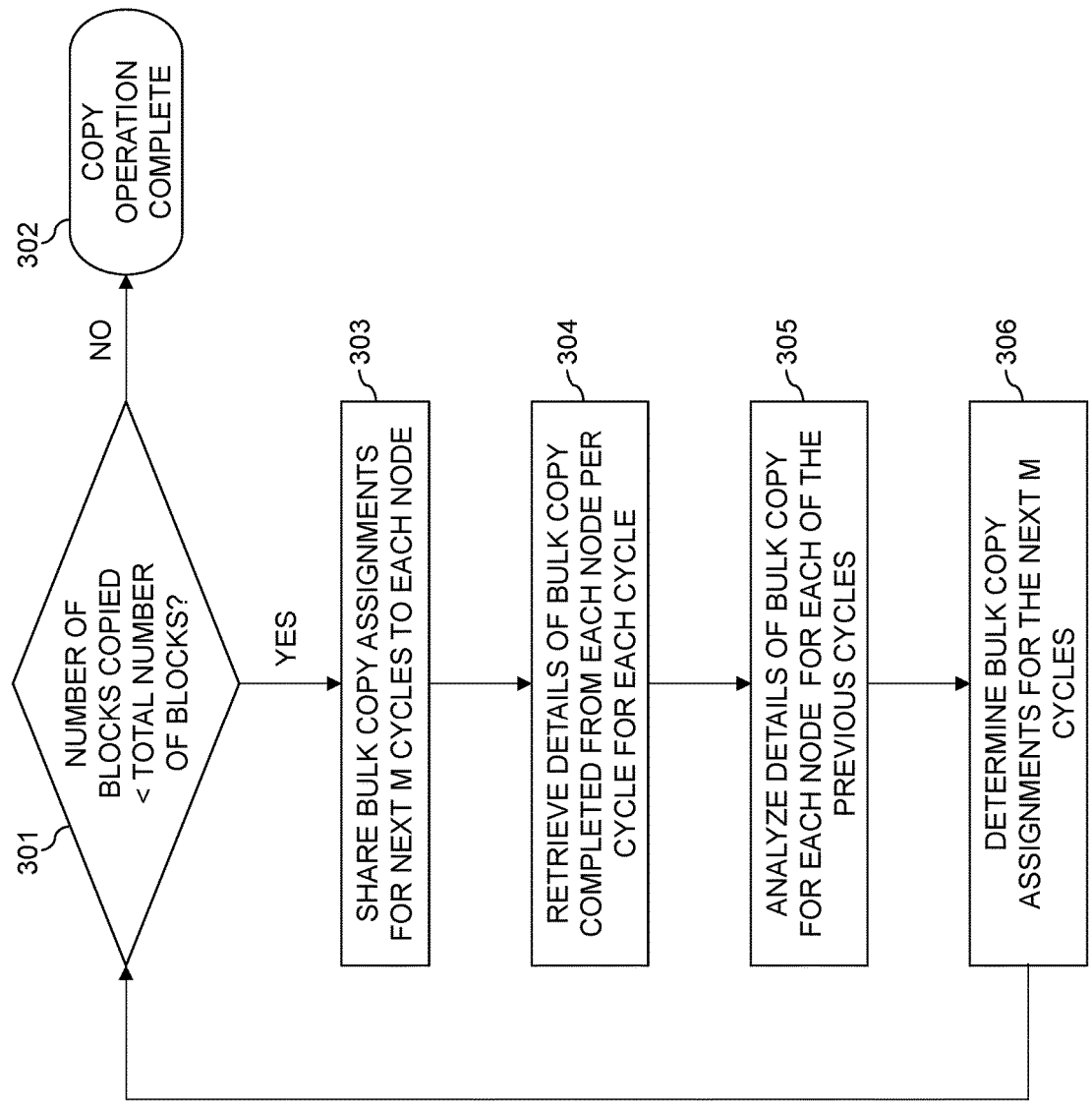
FIG. 3 is a flow diagram of an example process for data migration workload distribution among a plurality of nodes in an illustrative embodiment.

The process as shown in FIG. 3 includes steps 301 through 306, and is suitable for use in the system 100 but is more generally applicable to other types of systems comprising multiple host devices and a shared storage system. For example, the multiple host devices and shared storage systems do not necessarily require multi-pathing as described herein, and can be applied to systems without multi-pathing capabilities. The shared storage system in this embodiment is assumed to comprise at least one storage array having a plurality of storage devices. The storage devices can include logical storage devices such as LUNs or other logical storage volumes. The process will be described with reference also to FIG. 2.

Referring to step 301, the migration node determines whether the number of data blocks (e.g., data chunks) already copied is less than the total number of data blocks. In response to a negative determination at step 301, the process proceeds to step 302, where the migration node determines that the copy operation is complete. In response to a positive determination at step 301, the process proceeds to step 303, where the migration node shares the bulk copy assignments for the next M cycles with each node (e.g., host devices 202) of a cluster of nodes (e.g., active-active cluster 201). The bulk copy assignments refer to the number of data chunks to be copied by each node for the next M cycles, where M is ≥1. Then, at step 304, the migration node retrieves the details of bulk copy completed from each node per cycle for each of the M cycles. For example, using the communication modules 216 and the progress monitoring modules 217, the migration node retrieves the number of data chunks copied in a given cycle and the time taken to copy the data chunks for a given cycle as shown in the table 500 in FIG. 5. At step 305, for each of the previous cycles, the data migration service logic 214 of the migration node analyzes the details of bulk copy for each node. In other words, the data migration service logic 214 of the migration node determines the copy sweep capacities for each node, and based on the copy sweep capacities, determines the performance of each node of the cluster. Referring to step 306, based on the analysis at step 305, the data migration service logic 214 of the migration node determines the bulk copy assignments for the next M cycles, where M is ≥1. In illustrative embodiments, the number of data chunks assigned to a given node may incorporate a load factor (e.g., 80% of an allowable load for a given device) to reduce the number of data chunks that are processed by the given device. The load factor functions as a safety factor to prevent a device from being overloaded and/or to make resources available in the event of a problem or unexpected processing needs. According to one or more embodiments, the number of data chunks assigned to a given node for the next M cycles is computed according to the following equation (2):

$$CR_{Next\ M\ Cycles} = \text{Current Copy Sweep Capcity} * \text{Load Factor} * \text{Cycle Length} \qquad (2)$$

where $CR_{Next\ M\ Cycles}$ is the number of data chunks for a node for the next M cycles.

The process then returns to step 301 where the migration node again determines whether the number of data blocks (e.g., data chunks) already copied is less than the total number of data blocks.

The migration node is configured to communicate these assignments to the other associated host devices 202, i.e., host device 202-1, 202-2, ... 202-N, for example, using the communication module 216 residing on each of the host devices 202. The data migration may also be triggered by the migration node by sending a command to each associated host device 202 having an assigned share of the data chunks, e.g., via the communication modules 216. In some embodiments, the migration node may be assigned to perform a portion of the distributed migration. In some embodiments, the migration node may divide the portions among the associated host devices 202 without assigning a portion to itself.

The migration node, via the communication modules 216, sends copy sweep requests for M cycles, including the number of data chunks to be copied, to each node (e.g., host device 202) in a cluster (e.g., active-active cluster 201). The periodicity of a cycle can be user configurable or automatically determined by the data migration service logic 214 using one or more pre-defined parameters (e.g., cluster heartbeat duration or other threshold).

In illustrative embodiments, the progress monitoring modules 217 can be implemented via cluster resources software, which is provided by an operating system (OS). The collected copy operation data for each node may be viewed by all the nodes of a cluster. The IOCTLs for record viewing can be provided via a custom cluster IOCTL, which a cluster service can provide. In some embodiments, the cluster service on each node can be implemented using a daemon service. The copying operations are implemented by the cluster service on a given node, in conjunction with a corresponding copy driver 215. The copy drivers 215 may be kernel mode or user mode drivers.

Each host device 202 individually copies their corresponding assigned data chunks using respective instances of data migration service logic 214. Upon completion of a given cycle or plurality of cycles, each host device 202 (other than the migration node) transmits a message to the migration node, e.g., via the communication modules 216, comprising an indication that the data migration for a given cycle or plurality of cycles has been completed.

Illustrative embodiments of the techniques and functionality of data migration service logic 114/214 will now be described in more detail with reference to the flow diagram of FIG. 4.

Figure 4:
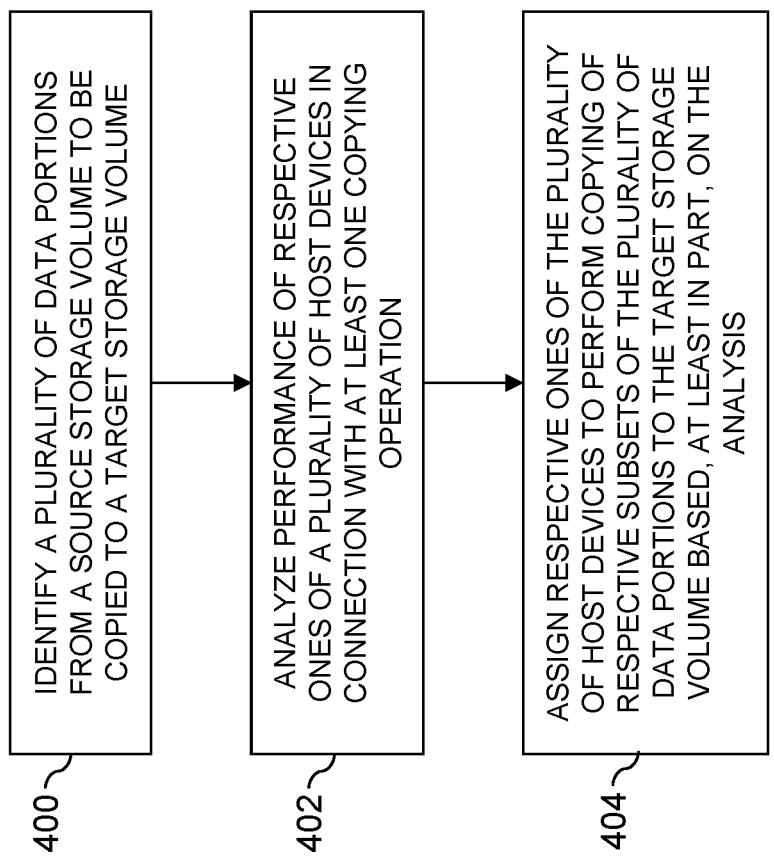
FIG. 4 is a flow diagram of an example process for data migration workload distribution among a plurality of nodes in an illustrative embodiment.

The process as shown in FIG. 4 includes steps 400 through 404, and is suitable for use in the system 100 but is more generally applicable to other types of systems comprising multiple host devices and a shared storage system. For example, the multiple host devices and shared storage systems do not necessarily require multi-pathing as described herein, and can be applied to systems without multi-pathing capabilities. The shared storage system in this embodiment is assumed to comprise at least one storage array having a plurality of storage devices. The storage devices can include logical storage devices such as LUNs or other logical storage volumes. The process will be described with reference also to FIG. 2.

In step 400, a plurality of data portions (e.g., data chunks 218 of equal size) to be copied from a source storage volume (e.g., source LUN 208) to a target storage volume (e.g., source LUN 208) are identified. In step 402, performance of respective ones of a plurality of host devices (e.g., host devices 202) in connection with at least one copying operation is analyzed to determine different performance levels of the respective ones of a plurality of host devices.

In step 404, respective ones of the plurality of host devices are assigned to perform copying of respective subsets of the plurality of data portions to the target storage volume based, at least in part, on the analysis. The respective subsets comprise different numbers of the plurality of data portions (e.g., different numbers of data chunks) for at least two host devices. For example, at least one host device is assigned to copy a subset with a higher number of the plurality of data portions than at least one other host device, wherein the at least one host device is determined to be higher performing (e.g., having a higher copy sweep capacity for at least one previous cycle) than the at least one other host device.

As described herein, the copy sweep capacity (data chunks per second) for each host device in a cluster comprises a ratio of the total number of data portions copied by the host device for a given cycle (or plurality of cycles) to the time taken for the total number of data portions to be copied by the host device for the given cycle (or plurality of cycles). The performance analysis and assignment of data chunks to be copied by each host device 202 is iteratively performed every M cycles, where M≥1. For example, performance of respective ones of the host devices in connection with the copying of first assigned numbers of data chunks for the at least one copy cycle is analyzed. Then, the respective ones of the plurality of host devices are reassigned to perform copying of second assigned numbers of data chunks for at least one additional copy cycle based, at least in part, on the analysis of the performance of the respective ones of the host devices in connection with the copying of first assigned numbers of data chunks.

The particular processing operations and other system functionality described in conjunction with the flow diagrams of FIGS. 3 and 4 are presented by way of illustrative example only, and should not be construed as limiting the scope of the disclosure in any way. Alternative embodiments can use other types of processing operations involving host devices, storage systems and functionality for distribution of data migration workloads among a plurality of nodes. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for distribution of data migration workloads among a plurality of nodes.

Functionality such as that described in conjunction with the flow diagrams of FIGS. 3 and 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The host devices 102/202 are an example of what are more generally referred to herein as "at least one processing device" comprising a processor and a memory, with the processor being coupled to the memory. References herein to "at least one processing device" can additionally or alternatively include at least a portion of the storage array 105. Other types of arrangements of one or more processing devices can be used to implement functionality for distribution of data migration workloads among a plurality of nodes as disclosed herein. For example, one or more of the host devices 102/202 can illustratively include multiple sets of one or more processing devices. Each such additional processing device also includes a processor and a memory coupled to the processor, and configured to perform at least a portion of the functionality for distribution of data migration workloads among a plurality of nodes.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple WWNs to the SAN 104 and the storage array 105. A WWN or WWID is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system in which multiple VMs run on a single ESXi server with HBAs. All VMs are using all HBAs but there is a need to be able to distinguish which IO belongs to which VM, for example, in order to implement different SLOs between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of VMs of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

These and other illustrative embodiments disclosed herein include functionality for distribution of data migration workloads among a plurality of nodes. At least portions of that functionality are implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used.

As described above, in illustrative embodiments disclosed herein, the host devices 102, and more particularly, migration nodes, are configured to dynamically distribute data migration workloads among a plurality of nodes based on node performance.

Also, although the example algorithms described above illustratively utilize MPIO drivers of respective host devices, other embodiments can be implemented outside of any multi-pathing software of the host devices. For example, other host device components can be used to distribute data migration workloads among a plurality of nodes.

It should also be noted that the example algorithms described above are not limited to use with particular types of IOs or IO command formats. For example, IOs comprising one or more commands of a standard storage access protocol, such as the above-noted SCSI and NVMe access protocols, can be utilized.

It is to be appreciated that the particular algorithm steps described above and elsewhere herein are presented by way of illustrative example only, and additional or alternative steps can be used in other embodiments. Also, the order of the steps can be varied, and/or at least some of the steps can be performed at least in part in parallel with one another.

Other types of arrangements for distribution of data migration workloads among a plurality of nodes can be used in other embodiments.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for distribution of data migration workloads among a plurality of nodes can be performed using different system components.

For example, various aspects of functionality for distribution of data migration workloads among a plurality of nodes in some embodiments can be implemented at least in part using one or more servers that are external to one or more of the host devices 102/202. Also, processing logic can be implemented using other types of host drivers, such as, for example, SCSI drivers, NVMe drivers or more generally other host device components.

The particular arrangements described above for implementing distribution of data migration workloads among a plurality of nodes are therefore presented by way of illustrative example only. Numerous alternative arrangements of these and other features can be used in implementing distribution of data migration workloads among a plurality of nodes in other illustrative embodiments.

As indicated previously, the illustrative embodiments disclosed herein can provide a number of significant advantages relative to conventional arrangements.

For example, some embodiments advantageously provide techniques for a migration node to periodically distribute copy workloads in cycles. In illustrative embodiments, the performance of a node for a given copy cycle is used to dynamically step up or step down a copy workload distributed to the given node in a subsequent cycle. In contrast, conventional approaches are static and fail to factor in differences in performance between nodes. In addition, with the static nature of current approaches, a slowest node in a cluster can delay the time for a copy operation to be completed.

Illustrative embodiments advantageously avoid problems of conventional practice by providing a migration service running continuously on each node. A migration node analyzes differences in performance of copy operations between the nodes, and determines workload size for each of the nodes based on the analyzed performance. As a result, workloads can be distributed among nodes of a distributed system while avoiding complex analysis of the resource states and of workloads of individual nodes, thereby improving resource utilization and reducing the time taken for migrations.

These and other embodiments avoid resource starvation by continuously monitoring and recording node performance over a plurality of copy cycles and dynamically updating node copy workload assignments based on real-time performance data from the nodes of a cluster. Advantageously, since the assignments are based on performance during recent copy operations, a migration node is able to estimate a current copy capacity of the nodes without resource data (e.g., HBA speeds, array connectivity states, path latency, etc.), and without data about current node workloads.

Various aspects of functionality associated with distribution of data migration workloads among a plurality of nodes as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102/202, SAN 104 and storage array 105 are illustratively implemented in the form of software running on one or more processing devices. As a more particular example, the instances of path selection logic 113 and data migration service logic 114/214 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, initiators, targets, path selection logic, data migration service logic, and additional or alternative components. Also, the particular configurations of system and device elements and associated processing operations illustratively shown in the drawings can be varied in other embodiments. For example, a wide variety of different host device and storage system configurations and associated arrangements for distribution of data migration workloads among a plurality of nodes can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to identify a plurality of data portions from a source storage volume to be copied to a target storage volume;
to analyze performance of respective ones of a plurality of host devices in connection with at least one copying operation, wherein analyzing the performance of the respective ones of the plurality of host devices comprises:
computing a first ratio of a first total number of data portions copied by a first one of the plurality of host devices to a first time taken for the first total number of data portions to be copied by the first one of the plurality of host devices;
computing a second ratio of a second total number of data portions copied by a second one of the plurality of host devices to a second time taken for the second total number of data portions to be copied by the second one of the plurality of host devices; and
comparing at least the first ratio with the second ratio; and
to assign respective ones of the plurality of host devices to perform copying of respective subsets of the plurality of data portions to the target storage volume based, at least in part, on at least one result of the analyzing.

2. The apparatus of claim 1 wherein the respective subsets comprise different numbers of the plurality of data portions for at least two host devices of the plurality of host devices.

3. The apparatus of claim 2 wherein respective data portions of the plurality of data portions to be copied to the target storage volume are equal in size.

4. The apparatus of claim 1 wherein, in analyzing the performance of the respective ones of the plurality of host devices, the at least one processing device is configured to identify at least one host device of the plurality of host devices with higher performance than at least one other host device of the plurality of host devices.

5. The apparatus of claim 4 wherein, in assigning the respective ones of the plurality of host devices to perform the copying of the respective subsets, the at least one processing device is configured to assign the at least one host device to copy a subset with a higher number of the plurality of data portions than the at least one other host device, wherein the assignment is based, at least in part, on the higher performance of the at least one host device.

6. The apparatus of claim 1 wherein, in analyzing the performance of the respective ones of the plurality of host devices, the at least one processing device is configured to identify total numbers of data portions copied by the respective ones of the plurality of host devices for at least one copy cycle of the at least one copying operation, wherein the identified total numbers include at least the first total number of data portions and the second total number of data portions.

7. The apparatus of claim 6 wherein, in analyzing the performance of the respective ones of the plurality of host devices, the at least one processing device is further configured to identify times taken for the total numbers of data portions to be copied by the respective ones of the plurality of host devices for the at least one copy cycle, wherein the identified times include at least the first time and the second time.

8. The apparatus of claim 7 wherein, in analyzing performance of the respective ones of the plurality of host devices, the at least one processing device is further configured to compute ratios of the total numbers of data portions copied by the respective ones of the plurality of host devices to the times taken for the total numbers of data portions to be copied by the respective ones of the plurality of host devices, wherein the computed ratios include at least the first ratio and the second ratio.

9. The apparatus of claim 1 wherein the at least one processing device is further configured to retrieve details of the performance from the respective ones of the plurality of host devices.

10. The apparatus of claim 1 wherein the at least one processing device comprises one of the plurality of host devices.

11. The apparatus of claim 1 wherein the plurality of host devices form an active-active cluster.

12. The apparatus of claim 1 wherein the at least one processing device is further configured to transmit the assignments to perform the copying of the respective subsets of the plurality of data portions to the respective ones of the plurality of host devices.

13. The apparatus of claim 1 wherein the assignments to perform the copying of the respective subsets of the plurality of data portions to the respective ones of the plurality of host devices are for at least one copy cycle corresponding to a designated time interval.

14. The apparatus of claim 13 wherein the at least one processing device is further configured:
to analyze performance of the respective ones of a plurality of host devices in connection with the copying of the respective subsets of the plurality of data portions for the at least one copy cycle; and
to re-assign the respective ones of the plurality of host devices to perform copying of additional respective subsets of the plurality of data portions to the target storage volume for at least one additional copy cycle based, at least in part, on the analysis of the performance of the respective ones of the plurality of host devices for the at least one copy cycle.

15. A computer program product comprising a non-transitory processor-readable storage medium having stored therein program code of one or more software programs, wherein the program code, when executed by at least one processing device comprising a processor coupled to a memory, causes the at least one processing device:
to identify a plurality of data portions from a source storage volume to be copied to a target storage volume;
to analyze performance of respective ones of a plurality of host devices in connection with at least one copying operation, wherein analyzing the performance of the respective ones of the plurality of host devices comprises:
computing a first ratio of a first total number of data portions copied by a first one of the plurality of host devices to a first time taken for the first total number of data portions to be copied by the first one of the plurality of host devices;
computing a second ratio of a second total number of data portions copied by a second one of the plurality of host devices to a second time taken for the second total number of data portions to be copied by the second one of the plurality of host devices; and
comparing at least the first ratio with the second ratio; and
to assign respective ones of the plurality of host devices to perform copying of respective subsets of the plurality of data portions to the target storage volume based, at least in part, on at least one result of the analyzing.

16. The computer program product of claim 15 wherein, in analyzing the performance of the respective ones of the plurality of host devices, the program code causes the at least one processing device to identify at least one host device of the plurality of host devices with higher performance than at least one other host device of the plurality of host devices.

17. The computer program product of claim 16 wherein, in assigning the respective ones of the plurality of host devices to perform the copying of the respective subsets, the program code causes the at least one processing device to assign the at least one host device to copy a subset with a higher number of the plurality of data portions than the at least one other host device, wherein the assignment is based, at least in part, on the higher performance of the at least one host device.

18. A method comprising:
identifying a plurality of data portions from a source storage volume to be copied to a target storage volume;
analyzing performance of respective ones of a plurality of host devices in connection with at least one copying operation, wherein analyzing the performance of the respective ones of the plurality of host devices comprises:
computing a first ratio of a first total number of data portions copied by a first one of the plurality of host devices to a first time taken for the first total number of data portions to be copied by the first one of the plurality of host devices;
computing a second ratio of a second total number of data portions copied by a second one of the plurality of host devices to a second time taken for the second total number of data portions to be copied by the second one of the plurality of host devices; and
comparing at least the first ratio with the second ratio; and
assigning respective ones of the plurality of host devices to perform copying of respective subsets of the plurality of data portions to the target storage volume based, at least in part, on at least one result of the analyzing;

wherein the method is performed by at least one processing device comprising a processor coupled to a memory.

19. The method of claim 18 wherein analyzing the performance of the respective ones of the plurality of host devices comprises identifying at least one host device of the plurality of host devices with higher performance than at least one other host device of the plurality of host devices.

20. The method of claim 19 wherein assigning the respective ones of the plurality of host devices to perform the copying of the respective subsets comprises assigning the at least one host device to copy a subset with a higher number of the plurality of data portions than the at least one other host device, wherein the assignment is based, at least in part, on the higher performance of the at least one host device.

* * * * *